United States Patent [19]

Suzaki et al.

[11] 3,817,620
[45] June 18, 1974

[54] METHOD OF GEODETIC MEASUREMENT USING DIFFUSION TYPE PULSE LASER

[75] Inventors: Yasuzi Suzaki, Tokyo; Yuji Yamamoto; Atsushi Tachibana, both of Yokohama, all of Japan

[73] Assignee: Hitachi, Ltd., Tokyo, Japan

[22] Filed: Oct. 16, 1972

[21] Appl. No.: 297,847

[30] Foreign Application Priority Data
Oct. 18, 1971 Japan.................. 46-81615

[52] U.S. Cl................... 356/1, 356/5, 343/112 R, 356/141
[51] Int. Cl................... G01c 3/00
[58] Field of Search.................. 356/4, 5, 1, 141; 343/5 CM, 112 R, 112 A, 112 D, 112 PT, 112 TC

[56] References Cited
UNITED STATES PATENTS
2,972,742  2/1961  Ross.................. 343/112 TC
3,352,223  11/1967  Garra.................. 356/5

*Primary Examiner*—Malcolm F. Hubler
*Assistant Examiner*—S. C. Buczinski
*Attorney, Agent, or Firm*—Craig & Antonelli

[57] ABSTRACT

Pulsed laser light is emitted at a certain interval and diffused in space by a pulse laser source installed on a flying object moving relative to the ground. The diffused laser light is received on the ground at a plurality of known points whose coordinates are all known and at, at least, one unknown point whose coordinates are to be determined so that the position of the flying object and the coordinates of the unknown point are determined by detecting the times of emission and reception of the laser pulse.

1 Claim, 6 Drawing Figures

PATENTED JUN 18 1974

METHOD OF GEODETIC MEASUREMENT USING DIFFUSION TYPE PULSE LASER

BACKGROUND OF THE INVENTION

1. Field of the Invention

This invention relates to a method of geodetic measurement and tracking a flying object by use of a monochromatic light pulse having a very short pulse duration and a great peak output, obtainable from a laser source, and by the time measurement which can be performed more accurately than the measurement of any other physical quantity.

2. Description of the Prior Art

The conventional geodesy has relied on optical observation or measurement utilizing electromagnetic waves. A recent method using a laser radar system is also the same in principle as the conventional means. These methods are, however, limited in the scope of application due to various inconveniences inherent therein.

SUMMARY OF THE INVENTION

The present invention provides a geodetic method which is also useful for tracking a flying object, through an approach entirely different from the conventional method.

Figure 1:
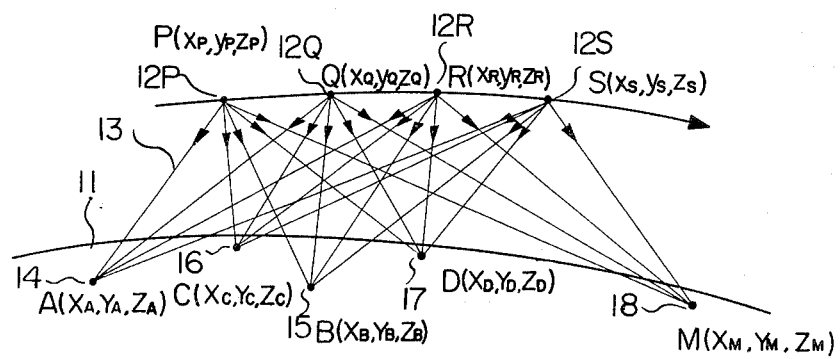
FIGS. 1 and 2 are illustrations necessary for explaining the principle of the present invention.

The principle of the invention will now be described with the aid of FIG. 1, in which numeral 11 designates the earth's surface; 12 a flying object carrying thereon a pulse laser source; 13 a pulsed laser emitted from the laser source 12; 14, 15, 16 and 17 the known points $A(X_A, Y_A, Z_A)$, $B(X_B, Y_B, Z_B)$, $C(X_C, Y_C, Z_C)$ and $D(X_D, Y_D, Z_D)$ in a predetermined three-dimensional rectangular coordinate space; 12P, 12Q, 12R and 12S the space points $P(x_P, y_P, z_P)$, $Q(x_Q, y_Q, z_Q)$, $R(x_R, y_R, z_R)$ and $S(x_S, y_S, z_S)$ in the same coordinate system as above, at which points the flying object emits laser light for a very short time; and 18 the unknown point $M(X_M, Y_M, Z_M)$ which is to be determined according to the proposed method.

Now, let a set of synchronized clocks be installed at the points A, B, C, D and M on the earth's surface and on the flying object. If the points of time at which the flying object emits a pulsed laser, that is, the moments when the object passes through the points P, Q, R, S, respectively, are detected by the clock on the object and if the pulsed laser light is received on the earth at the known points A, B, C, D and at the point M to be determined and the times of arrival of the light at the respective points are recorded by the associated clocks, then the linear distance between each of the points A, B, C, D and M and each of the points P, Q, R, and S can be obtained by calculating the time difference between any one of the points A, B, C, D and M and any one of the points P, Q, R and S and then by making a product of the calculated time difference and the velocity of light. If the linear distances from more than three known points to one of the points P, Q, R and S are obtained, the coordinates of the point can be determined as a point of intersection of spherical surfaces having radii of the distances and centered at the known points, respectively. In like manner, the coordinates of the point M to be measured can be determined as a point of intersection of spherical surfaces having centers at the points P, Q, R, S, which can be made known, and radii equal to the linear distances from the point M to the points P, Q, R, S. According to the method described above, a set of synchronized clocks are needed at all of the known and unknown points on the ground and at the moving point on the flying object. There is, however, proposed another system in which no clock is necessary to be installed on the flying object and the synchronization of clocks are required only between the known points A, B, C and D while the clock at the point to be measured have not to be synchronized. The principle of this system will now be described by reference to FIG. 1. Let the times of arrival of the laser pulse emitted from the point $i$ on the flying object ($i$ represents in general points P, Q, R and S at different moments) at the known points A, B, C and D on the ground, indicated respectively at 14, 15, 16 and 17, be given by $t_{iA}$, $t_{iB}$, $t_{iC}$ and $t_{iD}$, then it follows that $$[(x_i - X_A)^2 + (y_i - Y_A)^2 + (z_i - Z_A)^2]^{1/2} - [(x_i - X_B)^2 + (y_i - Y_B)^2 + (z_i - Z_B)^2]^{1/2} - C_o(t_{iA} - t_{iB}) = 0 \quad (1)$$

$$[(x_i - X_B)^2 + (y_i - Y_B)^2 + (z_i - Z_B)^2]^{1/2} - [(x_i - X_C)^2 + (y_i - Y_C)^2 + (z_i - Z_C)^2]^{1/2} - C_o(t_{iB} - T_{iC}) = 0 \quad (2)$$

$$[(x_i - X_C)^2 + (y_i - Y_C)^2 + (z_i - Z_C)^2]^{1/2} - [(x_i - X_D)^2 + (y_i - Y_D)^2 + (z_i - Z_D)^2]^{1/2} - C_o(t_{iC} - t_{iD}) = 0 \quad (3)$$

where $C_o$ is the velocity of light. The equations (1), (2) and (3) respectively denote hyperboloids since the difference between the distance from the point $i$ to the fixed point A and the distance from the point $i$ to the fixed point B is constant and so on. Therefore, the point $i$ $(x_i, y_i, z_i)$ at which the laser pulse was emitted, can be obtained by calculating the point of intersection of these hyperboloids. On the other hand, let the time of arrival of the laser pulse emitted from the point $i$ $(x_i, y_i, z_i)$ at the point M be $t_{iM}$, then it follows that $$[(X_M - x_P)^2 + (Y_M - y_P)^2 + (Z_M - z_P)^2]^{1/2} - [(X_M - x_Q)^2 + (Y_M - y_Q)^2 + (Z_M - z_Q)^2]^{1/2} - C_o[(t_{PM} - t_{QM}) - (t_P - t_Q)] = 0 \quad (4)$$

$$[(X_M - x_Q)^2 + (Y_M - y_Q)^2 + (Z_M - z_Q)^2]^{1/2} - [(X_M - x_R)^2 + (Y_M - y_R)^2 + (Z_M - z_R)^2]^{1/2} - C_o[(t_{QM} - t_{RM}) - (t_Q - t_R)] = 0 \quad (5)$$

$$[(X_M - x_R)^2 + (Y_M - y_R)^2 + (Z_M - z_R)^2]^2 - (X_M - x_S)^2 + (Y_M - y_S)^2 + (Z_M - z_S)^2]^{1/2} - C_o[(t_{RM} - t_{SM}) - (t_R - t_S)] = 0 \quad (6)$$

where $t_i$ ($i = P, Q, R, S, \ldots$) is the time at which the laser pulse is emitted from the point $i$ $(x_i, y_i, z_i)$. Since the coordinates of the point $i$ can be obtained from the equations (1), (2) and (3), the distances from the point $i$ to the known points can also be obtained. Therefore, the time $t_i$ can be obtained by subtracting the duration of time which light requires to travel from the point $i$ ($x_i$, $y_i$, $z_i$) to one of the fixed points, from the time of arrival of the laser pulse emitted from the point $i$ ($x_i$, $y_i$, $z_i$) at the one fixed point. The equations (4), (5) and (6) also represent three different hyperboloids so that the coordinates of the point M to be measured are obtained as a point of intersection of these hyperboloids.

Figure 2:
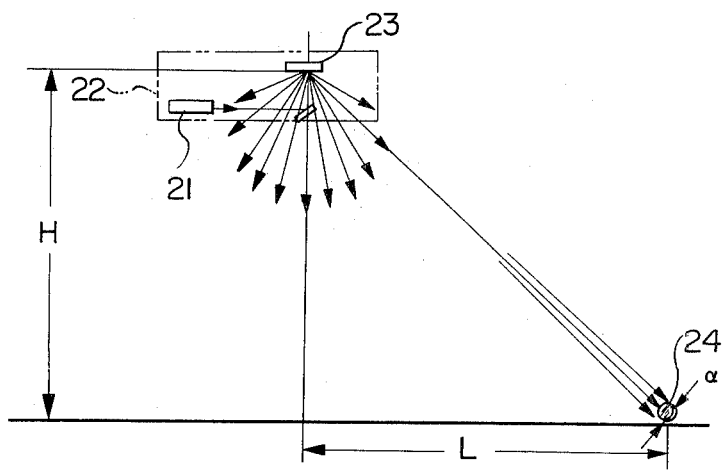
Figure 3:
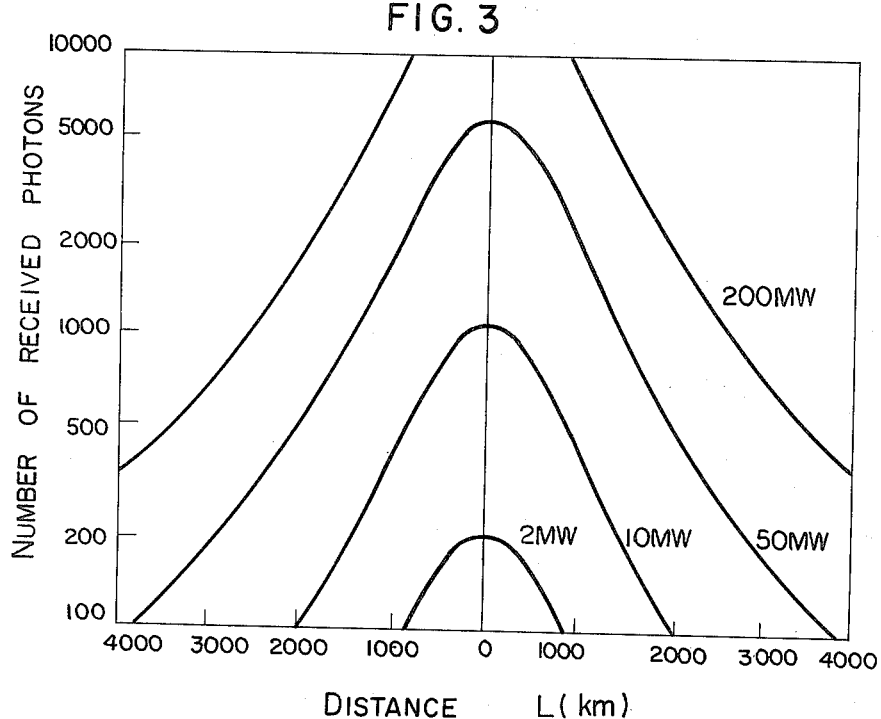
FIG. 3 shows a pattern of reception intensity attainable with the measurement according to the invention.

In order to realize such a geodetic method as described above, it is necessary that diffused light emanating from the flying object and having a very short pulse duration should be detected anywhere over a wide area on the ground. The way of fulfilling such a requirement will now be described through numerical calculations. In FIG. 2, a pulse laser generator 21 is carried by an flying object 22 navigating the space at a height of $H$ above the earth's surface; a diffusing element 23 for diffusing laser light is a diffusing plate having a reflecting factor $\rho$. Now, if laser with output $P_o$ and pulse duration $\tau$, diffused and cast toward the ground, is received by a receiving optics 24 having a diameter $a$ and located at a place apart by a distance $L$ from the point just below the flying object 22, the expected number of received photons $N_S$ is given by the expression $$N_S = P_o \tau T_e T_r \rho a^2 H \, T/4(H^2+L^2)^{3/2} \cdot \lambda/hc_o \text{ (photons)} \quad (7)$$

where $T_e$ is the efficiency of the optical system of the transmitter; $T_r$ the efficiency of the receiving optics on the ground; $T$ the permeability of the air to the laser light; $\lambda$ the wavelength of the laser; $h$ the Planck's constant; and $C_o$ the velocity of light. An example is taken in which a laser source is installed on an artificial satellite orbiting the earth at a height of 1,000 km. If, in this case, the expression (7) is numerically calculated on the basis of the quantities listed in the table 1 given below, which are all practical values, the result is that which is shown in FIG. 3. Namely, if a laser oscillator having an output of 10 MW and a pulse duration of 20 ns can be installed on the artificial satellite, a receiving optics having a diameter of 20 cm is expected to receive a light of more than 100 photons anywhere in a tract having a diameter of 4,000 km.

TABLE 1

| Symbol | Meaning of symbol | Numerical example |
|---|---|---|
| $P_o$ | laser output | 2–200 MW=$2\times10^6$–$10^8$ W |
| $T_e$ | efficiency of optical system of transmitter | 0.7 |
| $\Sigma$ | reflecting factor of diffusing plate | 0.9 |
| $T$ | permeability of air to laser | 0.7 |
| $a$ | diameter of receiving optics | 20 cm |
| $T_r$ | efficiency of optical system of receiver | 0.5 |
| $H$ | height from the ground to the diffusing plate | 1000 km = $10^8$ cm |
| $L$ | distance from a place just below the diffusing plate to the receiving optics | 0–4000 km=0–$4\times10^8$ cm |
| $\lambda$ | wavelength of the laser | 5300 A. =$5.3\times10^{-5}$ cm |
| $\tau$ | duration of laser pulse | 20 ns = $2\times10^{-8}$ s |
| $h$ | Planck's constant | $6.625\times10^{-34}$ J.s |
| $C_o$ | velocity of light | $2.997925\times10^{10}$ cm/s |
| $N_S$ | number of photons in reception | photons |

In this case, the laser wavelength is identified as that of the second harmonic of the Nd-YAG of Nd-Glass laser, i.e., 5,300 A. If the received light has an intensity of several hundreds of photons under the background of the night sky, the reception of the light will be in a sufficient probability when photomultiplier tubes are used to form a coincidence detection system. If the coincidence detection is performed in which on the assumption that the waveform of the laser pulse is in the Gaussian type and that the output fluctuation exhibits the Poisson distribution, $m$ number of receiving optics and number of photomultiplier tubes are used, the detection probability $P_S(M)$ is approximately given by the following expression:

$$P_S(M) = \left[ 1 - BT_t \left\{ (S_n\eta + nd) \frac{1}{B} \sum_{x=N_t}^{\infty} \frac{1}{x!} \exp(-1) \right\}^M \right]$$

$$\times \left[ 1 - \prod_{i=-\infty}^{\infty} \left\{ 1 - \sum_{x=N_t}^{\infty} \frac{(\bar{n}_i)^x}{x!} \exp(-\bar{n}_i) \right\}^M \right] \quad (8)$$

where $\bar{n}_i = 2\cdot 4 \, (B\tau)^{-1} S_n g(y_i)$; $g(y_i) = (2\pi)^{-1/2} \exp(-y_i^2/2)$ and $y_i = 2\cdot 4(B\tau)^{-1} i; (i = -\infty, \ldots, -1, 0, 1, 2, \ldots, \infty)$.

The meanings of the symbols used in the above expression and numerical examples of the quantities designated by the symbols are tabulated below.

TABLE 2

| Symbol | Meaning | Numerical example |
|---|---|---|
| B | bandwidth of the receiver | 250 MHz |
| $T_t$ | pulse repetition interval | 5 s |
| M | number of coincidences | 2 |
| nd | number of dark current counts | 300 P·E/s |
| $\tau$ | laser pulse width (duration) | 20 ns |
| $\eta$ | quantum efficiency of photomultiplier tube | 0.1 |
| $S_n$ | number of incident photons from background = $S_b\Omega A_r\Delta\lambda \, K_r$ | $2\times10^5$ photons/s |
| $S_b$ | radiations from background night sky | $1.3\times10^7$ photons/cm$^2$S$_r$A$_s$ $\lambda$ at 5300 A. |
| $\Omega$ | field angle of receiving optics | $2\times10^{-5}$ S$_r$ (5 m rad) |
| $A_r$ | area of receiving optics | 314 cm$^2$ |
| $\Delta\lambda$ | bandwidth of used filter | 5A |
| $K_r$ | efficiency of optical system of receiver | 0.5 |

Figure 4:
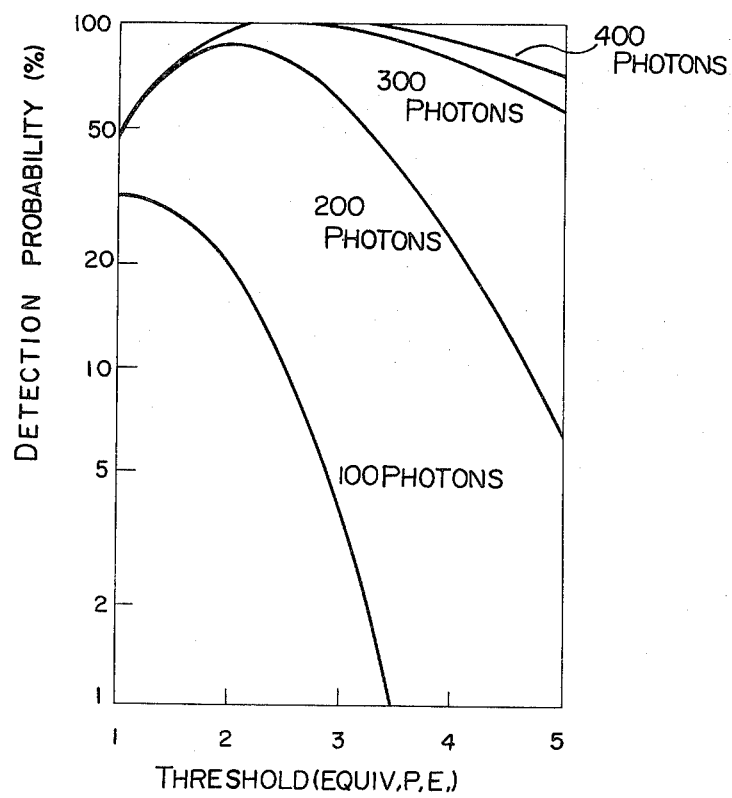
FIG. 4 shows detection probability attainable with the measurement according to the invention.

FIG. 4 shows the result obtained by numerically calculating the expression on the basis of the quantities listed in the table 2 above. In the figure, the curves are plotted with intensity of received light as a parameter, the coordinate system having the threshold level of the receiver on the abscissa and the detection probability on the ordinate. In this case, the laser pulse is repeated every 5 seconds and no range gate is provided in the receiver, and yet a detection probability of nearly 100 percent can be attained for the intensity of about 300 photons.

Thus, the practicability of this invention can be verified by the fact stated above that the laser pulse from the diffusion type laser oscillator can be effectively received over a wide range.

DESCRIPTION OF THE PREFERRED EMBODIMENT

Figure 5:
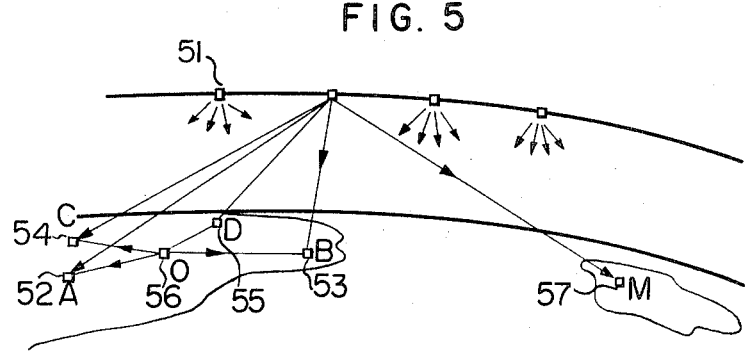
FIGS. 5 and 6 show the constitutions of an embodiment of the invention and of a receiver used in the embodiment, respectively.
Figure 6:
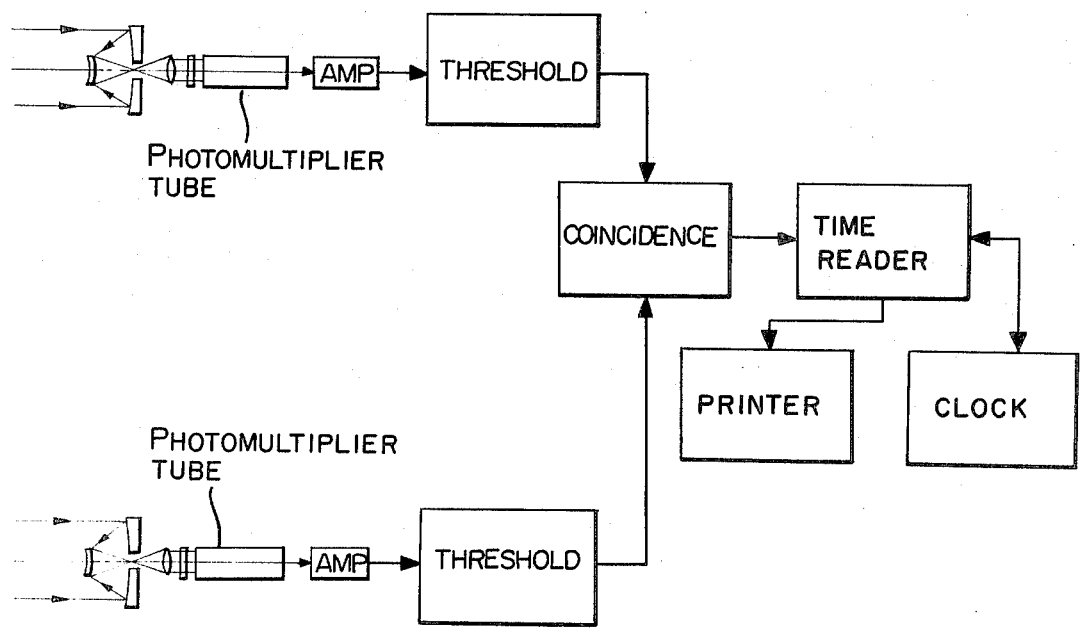

In one embodiment of the present invention, an articifial satellite is used as a flying object on which a laser apparatus is installed. The schematic constitution of the embodiment is shown in FIGS. 5 and 6, FIG. 5 showing the overall system and FIG. 6 the block diagram of one of the receivers used here: wherein a satellite 51 carries thereon a laser apparatus; receivers 52 to 55 whose constitution is shown in FIG. 6 are provided at the points A, B, C and D on the ground whose coordinates are all known; a subsystem 56 comprising a laser pulse oscillator located at the open place O so as to be easily viewed from the known points A, B, C and D and an optical system for dispersing and directing the laser light toward all the known points, serves to synchronize the clocks installed at the known points; and a receiver 57 located at the point M to be measured has the same constitution as shown in FIG. 6. This embodiment corresponds to the latter example described in the previous "Summary of the Invention." At first, before the actual measurement is performed, beams are emitted from the laser pulse at the point O toward the known points A to D to be received there so that the times of arrival of the pulsed laser beams at the known points are read out. And, various fluctuations can be eliminated through the repetition of such operations as described just above. The relative difference in timing of the clocks at the points A to D can be precisely known by considering the times which light requires to travel from the point O to the points A, B, C and D, respectively. And, it is needless to say that the clocks at the known points need not be synchronized since relative differences in the timing among them are accurately known. A satellite orbiting the earth at a height of several thousand kilometers takes about several tens of minutes for each complete round. If, therefore, a clock sold on market which uses therein a quartz oscillator is used to measure time, no appreciable error in timing will occur during the measurement even for the accuracy of 1 ns ($10^{-9}$s) in reading the measured values.

If laser pulses are repeatedly emitted from the satellite at a rate of about one pulse per 5 seconds and directed after repeated diffusion toward the known points and the point to be measured to be received there. If the times of arrival of the laser pulse at the respective points are measured, 100 pieces of data will be able to be obtained during the measurement for 10 minutes. From among the 100 data are selected a group of data counted at all the points, which are substituted into the expressions (1) to (3) and (4) to (6) so that the coordinates of the points where the laser pulse are emitted and those of the point to be measured can be determined through calculation. In cases where the laser source is installed on an artificial satellite and the coordinates of a point is to be determined with the aid of the expressions (1) to (3) and (4) to (6), the coordinates of the points can be presumed in a certain range.

Therefore, by use of the data obtained in the range is provided a method according to which such a smaller range as satisfied by the expressions (1) to (3) and (4) to (6) is obtained. And, an electronic computer could support the practicability of this method.

The meritorious features of this invention are as follows in comparison with the conventional optical and/or electromagnetic method or with the recent method using a laser radar.

i. Simultaneous measurement of a great number of points is possible and the coordinates of each point are of three dimensions.

ii. The range of measurement can be very wide. For example, let a laser apparatus with an output of 10 MW and a pulse width of 20 ns be installed on an artificial satellite, then an area having a diameter of about 3,000 Km, i.e., area covering the whole islands of Japan, can be measured by the use of optical systems, each having a receiving optics with a diameter of about 20 cm. If the output of the laser apparatus is increased up to 200 MW, the measurable range covers an area having a diameter of about 8,000 km (See FIG. 3).

iii. The photographing of the satellite and the angular information thereof are needless, whereas they are necessary if the conventional optical method using an artificial satellite is practised. Therefore, the limit to accuracy can be eliminated.

iv. The difficulty of simultaneity in measurement necessary in case of active measurement using a laser radar in which laser beam is casted from the earth's surface, can be avoided.

v. The obtained data are all in digital quantity and an electronic computor can be used for data processing to make it easy.

vi. The system according to the invention contains the light source in itself and no restriction is imposed upon the time of measurement unless the background light is so unfavorable.

The present invention, as has already been described, is adapted not only for a large-scale geodesy but for navigation by ship across the ocean and the tracking of artificial satellites and space craft.

What we claim is:

1. A geodetic method wherein pulsed laser light is emitted at a certain interval and diffused in space by a pulse laser source installed on a flying object moving relative to the ground, the diffused pulsed laser light is received on the ground at a plurality of known points whose coordinates are all known and at one or more unknown points whose coordinates are unknown and to be determined, and the position of the flying object and the coordinates of the unknown points are determined by detecting the times of emission and detection of the laser pulse.

* * * * *